Patented Oct. 9, 1945

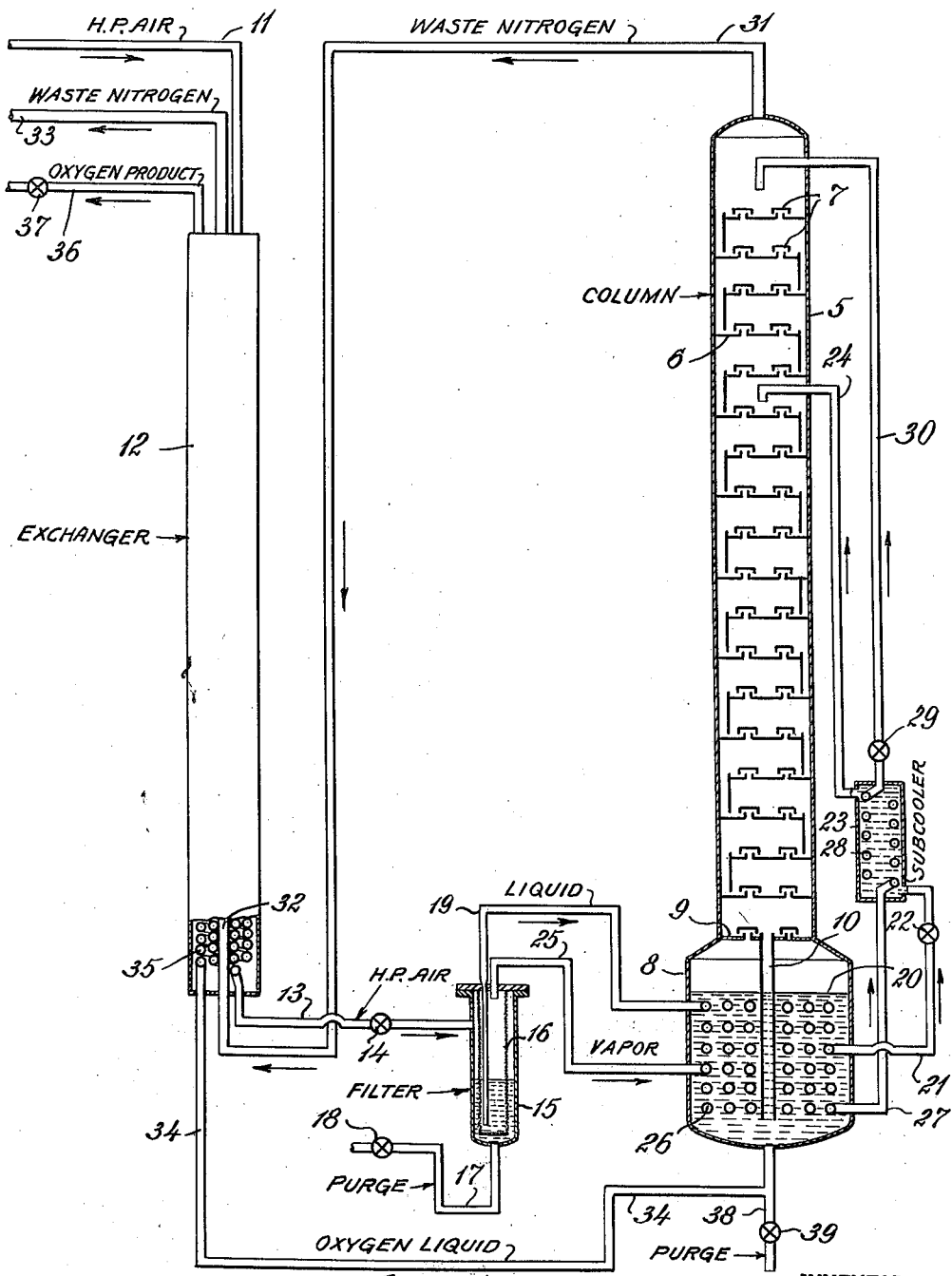

2,386,297

UNITED STATES PATENT OFFICE 2,386,297

SEPARATION OF THE CONSTITUENTS OF GASEOUS MIXTURES BY LIQUEFACTION AND RECTIFICATION

Wolcott Dennis, Darien, Conn., assignor to Air Reduction Company, Incorporated, New York, N. Y., a corporation of New York Application October 7, 1943, Serial No. 505,292

10 Claims. (Cl. 62—175.5)

This invention relates to the separation of the constituents of gaseous mixtures by liquefaction and rectification. The improvement has reference particularly to the more efficient operation of single rectification columns whereby a greater proportion of the desired constituent of the gaseous mixture treated can be recovered. It will be exemplified by reference to the recovery of oxygen from atmospheric air, although the invention is applicable to the treatment of other gaseous mixtures.

It is well known that in a single column operating on atmospheric air with a reflux of liquid air delivered to the top of the rectifier, the oxygen content of the waste gas or effluent cannot be reduced below about 7%, so that a considerable part of the oxygen entering the system is lost. Such losses are avoided in double columns by provision of a reflux of liquid nitrogen at the expense of substantial complication of the method and apparatus used. In many installations, simplicity of structure and operation are desirable, and hence the use of a double column is to be avoided.

It is the object of the present invention to provide an improvement in the method of operation and structure necessary for the separation of the constituents of gaseous mixtures which permits a greater and hence more economical recovery of the desired constituent, as for example oxygen, from atmospheric air.

Other objects and advantages of the invention will be apparent as it is better understood by reference to the following specification and the accompanying drawing, which illustrates diagrammatically an apparatus suitable for the practice of the invention.

Referring to the drawing, 5 indicates a column having the usual trays 6 and bubble caps 7 to facilitate contact of the liquid descending through the column with the vapor rising therethrough whereby separation of the constituents of the gaseous mixture is effected. A vaporizer 8 is provided at the bottom of the column and is separated therefrom by a partition 9. An overflow pipe 10 delivers liquid from the bottom of the column into the vaporizer.

The gaseous mixture to be separated, for example air, after compressing to the desired pressure and precooling, is delivered through a pipe 11 to an exchanger 12 wherein it is cooled and partially liquefied by heat exchange with products of the separation leaving the column 5 and vaporizer 8 as hereinafter described. The partially liquefied air is delivered by a pipe 13 through an expansion valve 14 to a filter 15 having a suitable screen 16 therein to prevent the passage of solidified material such as solid carbon dioxide into the column. The filter may be purged from time to time through a pipe 17 and valve 18 to remove accumulations of solid material.

Within the filter 15, the air is segregated into the liquid and gaseous phases which are in phase equilibrium at the pressure maintained. The liquid is withdrawn from the bottom of the filter through a pipe 19 and is delivered to a coil 20 submerged in the liquid oxygen which accumulates in the vaporizer and is thus further cooled. The liquid is withdrawn through a pipe 21 and expansion valve 22 and enters a sub-cooler 23, the function of which is hereinafter explained. From the sub-cooler the liquid is delivered through a pipe 24 to the column 5 and flows downwardly over the trays 6.

The vapor is withdrawn from the filter 15 through a pipe 25 and is delivered to a coil 26 submerged in the liquid oxygen in the vaporizer 8. The vapor is liquefied in the coil 26 and the liquid is delivered by a pipe 27 to a coil 28 submerged in liquid in the sub-cooler 23. Thus the liquid is further cooled to avoid evaporation thereof as it passes through the expansion valve 29 and pipe 30, whereby it is delivered as reflux at the top of the column 5.

As the two liquids descend in the column, they are subjected to contact with vapors rising therethrough from the vaporizer 8. The liquid is thus progressively enriched in oxygen until it is delivered to the vaporizer 8 as substantially pure oxygen, while the rising vapors are enriched in nitrogen and finally subjected to the reflux which is relatively rich in nitrogen. The reflux or waste gas escapes through a pipe 31 at the top of the column and is delivered to a pipe 32 extending through the exchanger 12, finally escaping through a pipe 33 to the atmosphere.

The oxygen product is withdrawn in liquid form from the vaporizer 8 through a pipe 34 and is delivered to a coil 35 within the exchanger 12. In passing through the exchanger, the incoming air gives up its heat to the liquid oxygen which is thus vaporized. The oxygen in the vapor phase escapes through a pipe 36 and valve 37 and may be stored in any suitable receptacle for use. A purge 38 controlled by a valve 39 is connected to the bottom of the vaporizer 8 so that any impurities accumulating in the vaporizer may be discharged from time to time.

It is apparent that if none of the air entering the filter 15 were liquefied, the liquid produced from the vapor phase in the coil 26 would have the composition of liquid air and hence when delivered to the column as reflux would afford no advantage. However, the liquefaction of a portion of the air and the resulting formation of liquid and gaseous phases results in enrichment of the liquid in oxygen and consequent enrichment of the gas phase in nitrogen. As the liquid phase fraction is increased, the gas phase fraction contains smaller percentages of oxygen. It is desirable, therefore, that the liquid fraction be as large as feasible. At the same time, the gas phase fraction should not be less than about 60% of the air flow in order to provide an adequate reflux in the column. The amount of the liquid phase present in the filter is greater with higher filter pressures, but at the same time the equilibrium relations are poorer. I have discovered, however, that with a filter pressure lying between 5 and 10 atmospheres, the optimum conditions are attained with sufficient reflux having a maximum proportion of nitrogen. The amount of liquid phase delivered to the filter is increased to a desirable proportion by withdrawing a liquid oxygen product from the column and utilizing the refrigeration of this product to cool the high pressure air. The addition of the rich nitrogen reflux thus obtained at the top of the column ensures the maximum recovery of oxygen from the air treated and consequently the minimum loss of oxygen in the effluent or waste gas. This affords the greatest efficiency possible in the operation of a single column in which a pure nitrogen reflux is not provided.

The use of the sub-cooler 23 is not absolutely essential, since desirable results can be accomplished without it. It is evident, however, that the throttling of the liquid through the valve 29 will result in some evaporation which tends to increase the oxygen content of the remaining liquid, thus reducing the efficiency of the reflux. By sub-cooling the liquid, evaporation is minimized and hence the nitrogen content of the reflux is maintained at the maximum obtainable.

The method and apparatus as described afford a relatively simple and effective means for the separation of gaseous mixtures such as air to permit recovery of a desired constituent thereof such as oxygen. Where the effluent is not utilized, its composition is unimportant except for the desirability of avoiding losses of the desired constituent therein. The method and apparatus as described eliminate much of the waste of the desired constituent which would result if the reflux consisted of liquid air rather than a material enriched in nitrogen as the result of the separation of the air into liquid and gaseous phases as described.

Various changes may be made in the details of the apparatus and the operation thereof without departing from the invention or sacrificing the advantages thereof.

I claim:

1. The method of separating the constituents of gaseous mixtures which comprises compressing and cooling the gaseous mixture to effect partial liquefaction thereof, segregating the liquid and gaseous phases under pressure, subjecting the gaseous phase to heat exchange with a liquid product of the separation, thereby producing a liquid rich in one of the constituents of the gaseous mixture and utilizing the latter liquid as reflux in the rectification of liquid phase of the initial segregation and of the vapors therefrom to produce a liquid consisting of the other constituent.

2. The method of separating the constituents of gaseous mixtures which comprises compressing and cooling the gaseous mixture to effect partial liquefaction thereof, segregating the liquid and gaseous phases under pressure of approximatly 5 to 10 atmospheres, subjecting the gaseous phase to heat exchange with a liquid product of the separation, thereby producing a liquid rich in one of the constituents of the gaseous mixture and utilizing the latter liquid as reflux in the rectification of liquid phase of the initial segregation and of the vapors therefrom to produce a liquid consisting of the other constituent.

3. The method of separating the constituents of gaseous mixtures which comprises compressing and cooling the gaseous mixture to effect partial liquefaction thereof, segregating the liquid and gaseous phases under pressure, sub-cooling the liquid phase by heat exchange with a liquid product of the separation, subjecting the gaseous phase to heat exchange with a liquid product of the separation, thereby producing a liquid rich in one of the constituents of the gaseous mixture and utilizing the latter liquid as reflux in the rectification of liquid phase of the initial segregation and of the vapors therefrom to produce a liquid consisting of the other constituent.

4. The method of separating the constituents of gaseous mixtures which comprises compressing and cooling the gaseous mixture to effect partial liquefaction thereof, segregating the liquid and gaseous phases under pressure, subjecting the gaseous phase to heat exchange with a liquid product of the separation, thereby producing a liquid rich in one of the constituents of the gaseous mixture, and sub-cooling and utilizing the latter liquid as reflux in the rectification of liquid phase of the initial segregation and of the vapors therefrom to produce a liquid consisting of the other constituent.

5. The method of separating the constituents of gaseous mixtures which comprises compressing and cooling the gaseous mixture to effect partial liquefaction thereof, segregating the liquid and gaseous phases under pressure of approximately 5 to 10 atmospheres, subjecting the gaseous phase to heat exchange with a liquid product of the separation, thereby producing a liquid rich in one of the constituents of the gaseous mixture, and sub-cooling and utilizing the latter liquid as reflux in the rectification of liquid phase of the initial segregation and of the vapors therefrom to produce a liquid consisting of the other constituent.

6. The method of separating oxygen and nitrogen from atmospheric air which comprises compressing and cooling the air to effect partial liquefaction thereof, segregating the liquid and gaseous phases under pressure, subjecting the gaseous phase to heat exchange with the liquid oxygen product of the separation thereby producing a liquid rich in nitrogen, and utilizing the latter liquid as reflux in the rectification of the liquid phase of the initial segregation and of the vapors therefrom to produce liquid oxygen.

7. The method of separating oxygen and nitrogen from atmospheric air which comprises compressing and cooling the air to effect partial liquefaction thereof, segregating the liquid and gaseous phases under pressure of approximately 5 to 10 atmospheres, subjecting the gaseous phase to heat exchange with the liquid oxygen product of the separation thereby producing a liquid rich in nitrogen, and utilizing the latter liquid as reflux in the rectification of the liquid phase of the initial segregation and of the vapors therefrom to produce liquid oxygen.

8. In an apparatus for separating the constituents of gaseous mixtures, a heat exchanger wherein the entering gaseous mixture is partially liquefied, means for segregating the liquid and gaseous phases, a rectification column having a vaporizer, means in the vaporizer to effect heat exchange and liquefaction of the vapor phase with a liquid product of the separation and means for delivering the segregated liquid phase and the liquefied vapor phase to different levels of the rectification column, the liquefied vapor phase being delivered at the higher level.

9. In an apparatus for separating the constituents of gaseous mixtures, a heat exchanger wherein the entering gaseous mixture is partially liquefied, means capable of withstanding pressures of approximately 9 to 10 atmospheres for segregating the liquid and gaseous phases, a rectification column having a vaporizer, means in the vaporizer to effect heat exchange and liquefaction of the vapor phase with a liquid product of the separation and means for delivering the segregated liquid phase and the liquefied vapor phase to different levels of the rectification column, the liquefied vapor phase being delivered at the higher level.

10. In an apparatus for separating the constituents of gaseous mixtures, a heat exchanger wherein the entering gaseous mixture is partially liquefied, means for segregating the liquid and gaseous phases, a rectification column having a vaporizer, means in the vaporizer to effect heat exchange and liquefaction of the vapor phase with a liquid product of the separation and means for delivering the segregated liquid phase and the liquefied vapor phase to different levels of the rectification column, the liquefied vapor phase being delivered at the higher level, including means to effect heat exchange between the two liquids before they enter the rectification column.

WOLCOTT DENNIS.